United States Patent [19]

Ichikawa

[11] Patent Number: 4,779,326

[45] Date of Patent: Oct. 25, 1988

[54] METHOD OF BONDING A METAL ROUND ROD TO A METAL PLATE

[75] Inventor: Muneshige Ichikawa, Tokyo, Japan

[73] Assignee: Japan Hollow Steel Co., Ltd., Tokyo, Japan

[21] Appl. No.: 38,117

[22] Filed: Apr. 14, 1987

[30] Foreign Application Priority Data

Jul. 11, 1986 [JP] Japan .................. 61-162037

[51] Int. Cl.⁴ .................. B21D 39/00; B23P 11/00
[52] U.S. Cl. ......................... 29/520; 29/521; 403/282; 411/180; 411/187
[58] Field of Search ............. 29/520, 521, 432, 432.1, 29/432.2; 411/176, 180, 187; 403/282

[56] References Cited

U.S. PATENT DOCUMENTS

| | | | |
|---|---|---|---|
| 2,177,191 | 10/1939 | Sandberg | 29/520 |
| 3,000,420 | 9/1961 | Spokes | 29/520 UX |
| 3,127,919 | 4/1964 | Swanstrom | 29/520 X |
| 3,399,705 | 9/1968 | Breed et al. | 29/520 X |
| 3,699,637 | 10/1972 | Rosiek | 29/520 X |
| 3,967,669 | 7/1976 | Egner | 29/520 X |
| 4,329,768 | 5/1982 | Tranberg et al. | 29/520 X |

FOREIGN PATENT DOCUMENTS

| | | |
|---|---|---|
| 732714 | 6/1955 | United Kingdom . |
| 902367 | 8/1962 | United Kingdom . |
| 1496360 | 12/1977 | United Kingdom . |
| 2024979A | 1/1980 | United Kingdom . |

Primary Examiner—Charlie T. Moon
Attorney, Agent, or Firm—Armstrong, Nikaido, Marmelstein & Kubovcik

[57] ABSTRACT

A metal rod having a radial flange formed at one end and space pointed projections formed on the underside of the flange is inserted through a round hole in a metal plate. The metal rod plate combination is placed in a press on a bottom die having an axial insertion hole and an annular step formation of alternate grooves and ridges on the top surface of the bottom die round the insertion hole. Under pressing force, metal of the metal plate in its region around the bottom edge of the round hole is extruded radially inwardly against the neck portion of the flanged metal round rod under the effect of the step formation on the bottom die while at the same time the projections are driven into the surface of metal plate. The resulting metal assembly exhibits substantially improved adhension and torsional resistance between the metal members.

3 Claims, 4 Drawing Sheets

METHOD OF BONDING A METAL ROUND ROD TO A METAL PLATE

FIELD OF THE INVENTION

The present invention relates to methods of bonding or rigidly securing a metal round rod such as a bolt or a shackle pin to a metal plate at right angles thereto and to metal round rods usable in the method and, more particularly, the invention relates to such methods in which a metal round rod can be firmly bonded to a metal plate and exhibit, in the state so bonded, an improved torsional resistance to relative rotation and to metal round rod usable in such methods.

BACKGROUND OF THE INVENTION

In the past, a method of bonding a metal round rod to a metal rod has been known in which the body or stem portion of a metal round rod is inserted through a round hole formed in a metal plate and then is welded around the periphery of the stem portion to the peripheral edge of the round hole in the metal plate by electric welding technique. In another known method of bonding such metal members together, knurling is done on the neck portion of a metal round rod flanged at one end or the stem portion of the flanged rod immediately beneath the end flange and knurled stem portion is then pressed in to a round hole formed in a metal plate in a diameter slighlty smaller than that of the stem portion so as to be bonded or rigidly secured to the metal plate.

Difficulties, however, have been experienced in these previous bonding methods on account of various technical problems involved therein. In the first method, which utilizes welding, occurrence of more or less thermal stress and strain is unavoidable and this necessitates special external surface treatments on the assembly produced for correction in angle between the metal plate and the metal round rod bonded thereto and for removal of defects resulting from head seizure, thus causing an increase in the cost of production. In the second method, which employs a knurling operation, the adhesion or bond strength obtainable between the metal round rod and the metal plate is unstable and limited particularly for forces that act on the metal rod in the direction from its distal end to the flange end, that is, in the direction opposite to that in which the metal round rod has been driven into the metal plate. In order to overcome this situation, it is required that the metal round rod be made of a high-quality special alloy steel (usually containing at least one of rare, alloying elements such as nickel, chromium, molybdenum, vanadium, and manganese) and be subjected to a particular heat treatment, thus involving a substantial increase in expense. Even with such measures resorted to, however, the adhesion or bond strength between the metal members must still be unstable since there is no guaranteeing of any mechanical bonding between the metal member that is effective under impact forces acting upon the metal rod in the direction from its free end toward its flanged end.

Under the circumstances, the present invention is intended to solve such previously encountered problems.

SUMMARY OF THE INVENTION

According to the first aspect of the present invention, a method of bonding a metal round rod to a metal plate at right angles thereto is provided in which the metal round rod is formed at one end thereof with an annular radially extending flange and a plurality of circumferentially spaced projections extending from the underside of the flange in the direction toward the other end of the metal round rod. The metal plate has a round hole formed therethrough to receive the stem portion of the flanged metal round rod. The method comprising the steps of: inserting the stem portion of the metal round rod axially through the round hole in the metal plate so that the projections on the underside of the annular flange of the metal round rod come to rest on the metal plate; placing the metal plate, with the metal round rod inserted therein, on top of a bottom die in a manner such that the stem portion of the metal round rod, extending downwardly beyond the metal plate, is inserted in an insertion hole formed in the bottom die in a diameter slightly larger than that of the stem portion of the metal round rod, the bottom die having an annular step formation of alternate grooves and ridges on the top surface thereof around the top edge of the insertion hole; and then applying a pressing force onto the top surface of the flange of the metal round rod so that the projections on the underside of the flange is driven into the adjacent, top surface of the metal plate and at the same time the metal of the metal plate in its region around the bottom edge of the round hole in the metal plate is compressed radially inwardly against the metal round rod to crimp the stem portion thereof under the effect of the annular step formation on the bottom die.

Accordingly to the second aspect of the present invention, a metal round rod directly usable in the method of the present invention is provided which is formed at one end with an annular radially extending flange and a plurality of circumferentially spaced pointed projections formed on the underside of the annular flange and extending therefrom toward the other end of the metal round rod.

As will be apparent from the foregoing, the present invention is intended to bond or rigidly secure a flanged metal round rod to a metal plate by causing projections formed on the underside of the flange of the metal rod to bite into the metal plate and at the same time causing metal of the metal plate, in its bottom face region neighboring the stem portion of the metal round rod, to bite into the latter in a crimping fashion so that the metal members once so bonded are stably held in the bonded state. It is to be noted, therefore, that the bonded metal structure or assembly made accordingly to the present invention can exhibit as its principal objective a torsional strength which is particularly high on account of the mechanical positivity of the bond between the two metal members.

The above and other objects, features and advantages of the present will become more apparent from the following detailed description of presently preferred embodiments of the invention, when taken in conjunction with the accompanying drawings.

DESCRIPTION OF THE PREFERRED EMBODIMENTS

Figure 1:
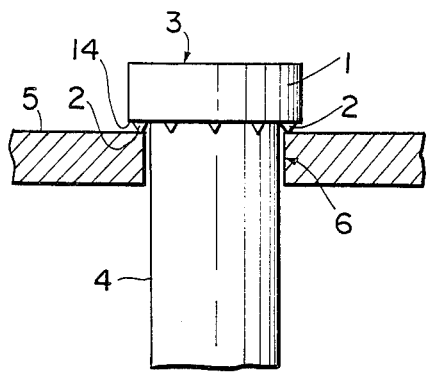
FIG. 1 is an explanatory diagram, partly in section, illustrating a method round rod inserted through a round hole in a metal plate in the initial stage of the bonding method according to the present invention.

Turning now the drawing and first to FIG. 1, a metal round rod 3 has an annular, radially extending flange 1 formed at one end thereof and a plurality of circumferentially spaced pointed projections 2 formed on the underside on the axially inside of the end flange 1. The shank or stem portion 4 of the flanged metal round rod 3 is inserted through a round hole 6 formed in a metal plate 5 of an appropriate thickness. In this manner, the metal plate 5 and metal round rod 3 are combined with each other, the metal 5 being fitted, as shown, over the neck portion of the metal round rod 3 immediately beneath the flange 1 thereof.

Figure 2:
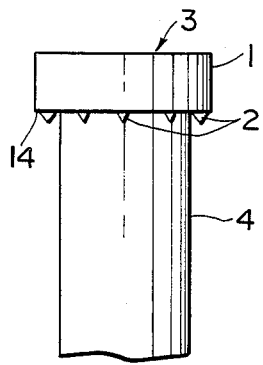
FIG. 2 is a front elevation of the metal round rod usable in the method of the present invention.
Figure 3:
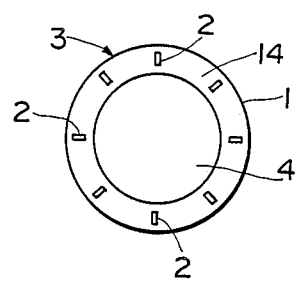
FIG. 3 is a bottom view of the metal round rod shown in FIGS. 1 and 2.
Figure 4:
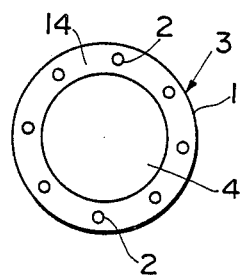
FIGS. 4 and 5 are views similar to FIG. 3, showing respective modifications of the metal round rod usable in the method of the present invention.
Figure 5:
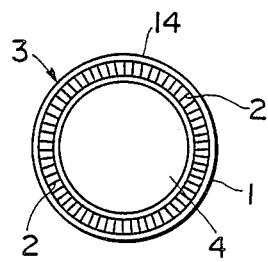
Figure 9:
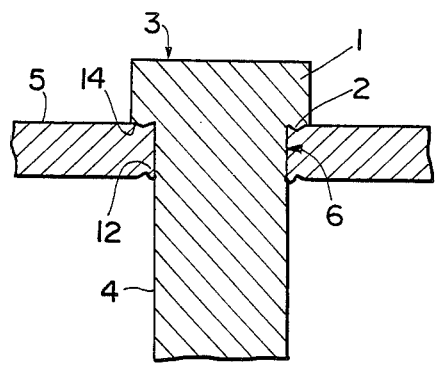
FIG. 9 is a cross-sectional elevation, illustrating the metal round rod in its final state bonded to the metal plate.

In this connection, it will be noted that the metal round rod 3 is a bar-like member usable, for example, as a bolt or a shackle pin and, as shown in FIG. 2, the stem portion 4 of the metal round rod 3 is in the form of a straight round bar having an appropriate outside diameter and the flange portion 1 of the metal round rod 3, formed at one end thereof, is typically in the form of a flat circular disc coaxial with the body of metal rod. Formed on the underside or the axially inside of the flange portion 1, which is in contact with the top surface of metal plate 5 in FIG. 1, are spaced projections 2, as will be described below in detail. The stem portion 4 has an appropriate length, extending from the flanged end of the metal rod 3 to the free, distal end thereof. It is to be noted that, when the metal rod 3 is bonded to the metal plate 5 according to the method of the present invention, as will be described further in detail, the spaced projections 2 are forced to bite into the adjacent, top surface of the metal plate 5, as shown in FIG. 9. As clearly seen in FIG. 3, the projections 2 in this embodiment are circumferentially arranged at equal intervals on the underside of the radially extending flange 1 and each take the form of a downwardly tapered sharppointed spike which is limited in circumferential width and radially elongate in cross section at right angles to the axis of the metal rod 3. It will be readily understood that the projections 2 are not limited in form to such spikes of limited width but may each take the form of a circular cone, which is tapered downwardly in vertical cross section, as illustrated in FIG. 4. Alternatively, the arrangement of projections 2 may take the form of a daisy-like pattern of alternate radially extending grooves and ridges, as illustrated in FIG. 5. In the embodiments of FIGS. 3 and 4 projections 2 are eight in number as illustrated but it will be apparent that their number is not so restricted and can be increased to nine or more or be decreased to seven or less, as desired.

Figure 6:
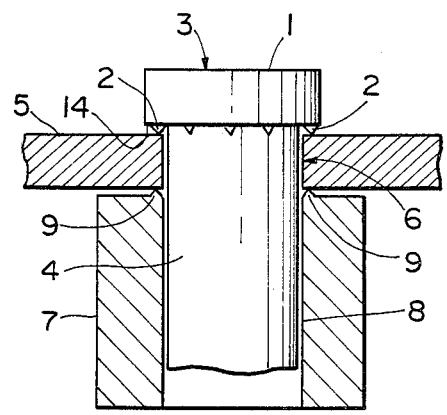
FIG. 6 is an explanatory diagram illustrating the metal plate rod combination of FIG. 1 in the state placed on top of a bottom die.
Figure 7:
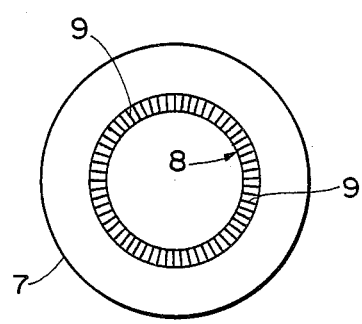
FIG. 7 is a top plan view of the bottom die shown in FIG. 6.
Figure 8:
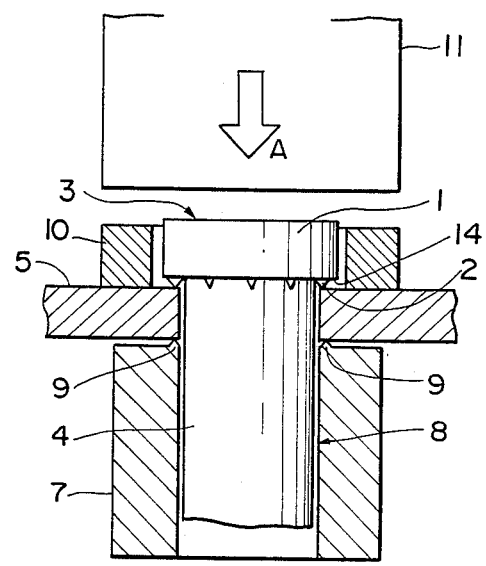
FIG. 8 is an explanatory diagram illustrating how, in a press operation, a pressing force is applied to the top flanged end of the metal round rod.

In accordance with the method of the present invention, the metal plate 5 and metal round rod 3 combination, such as illustrated in FIG. 1, is first placed on top of a bottom die 7, as shown in FIG. 6. As will readily be understood, the bottom die 7 is set in a bottom die bolster (not shown) which serves to support the pressing force applied onto the tops end face of the flange 1 of metal round rod 3 in a press or the like apparatus, as illustrated in FIG. 8 at 11. The bottom die 7 has an insertion hole 8 formed axially therethrough in a diameter slightly larger than that the stem portion 4 of flanged metal rod 3. Formed on the top surface of bottom die 7 around the top edge of insertion hole 8 is an annular step 9, for example, in a daisy like pattern of multiple rays or radially extend alternate grooves and ridges, as illustrated in FIG. 7. The metal plate 5 and metal round rod 3 combination is placed on the bottom die 7 with the stem portion 4 of the metal round rod 3 inserted in the insertion hole 8 bottom die 7 so that the bottom surface of metal plate 5 is held in contacting engagement with the annular step formation 9 on the top surface of bottom die 7, as shown in FIG. 6.

It will readily understood that the annular step formation 9 on the bottom die 7 is not restricted to the daisylike pattern illustrated in FIG. 7 and may take the form, for example, of a concentric formation around the top edge of insertion hole 8 including alternate circumferentially extending grooves and ridges.

Referring again to FIG. 8, a liner 10 of the same thickness as the end flange 1 of metal round rod 3 is placed on top of the metal plate 5 concentrically around the end flange 1. Subsequently, in operation of the press 11, hydraulic or mechanical, a pressing force is applied to the tops surface of the flange 1 of metal round rod 3 in the direction of arrow A. It is to be noted that, under the force of pressure acting between the press ram 11 and the bottom die 7, projectings 2 on the underside of the plange 1 are forced to bite into the adjacent, top surface of metal plate 5 while at the same time the metal 12 of metal plate 5 in its region around the bottom edge of the round hole is extruded or compressed radially inwardly against the stem portion 4 of metal round rod 3 to crimp the latter, under the effect of the step formation 9 on the top surface of bottom die 7.

In this connection, the liner 10 placed on top of the metal plate 5 serves to prevent the flange portion 1 of metal round rod 3 from being pushed down against the metal plate 5 is excess under the action of press 11 and, since the liner 10 has a thickness the same as that of flange 1, as described above, the press ram 11 acting upon the metal round rod 3 at its top flanged end 1 comes to stop just when the underside 14 of the end flange 1 is brought into close contact with the top surface of the metal plate 5, forcing the projections 2 to bite into the latter. The close contact of the under side or radially extending annular bottom surface 14 of the flange portion 1 of metal round rod 3 with the top surface of metal plate 5 is particularly important to serve the purpose of preventing penetration of any treating liquid as used in pretreatment of the bonded metal assembly for plating operation.

It will be readily recognized from the foregoing description that, since the metal 12 of metal plate 5 in its region around the bottom edge of round hole 6 is compressed radially inwardly against the metal round rod to crimp the stem portion 4 thereof while at the same time the projections 2 on the underside of the end flange 1 of metal round rod 3 are forced to bite into the top surface of the metal plate 5, the metal round rod 3 is not only bonded to the metal plate 5 in particularly firm and stable fashion against axial forces but also exhibits an improved torsional resistance in cases where it is subjected to a twisting moment.

Figure 10:
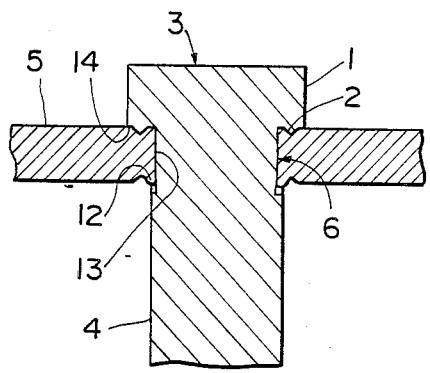
FIG. 10 is a view similar to FIG. 9, illustrating the bonded structure obtainable by another embodiment of the bonding of the bonding method of the present invention.

FIG. 10 is a explanatory cross-sectional diagram of another embodiment of the bonding method of the present invention. In this embodiment, the metal round rod 3 is formed around its neck portion immediately beneath the end flange 1 with one or more grooves 13 into which metal plate 12 of the metal 5 in its region around the bottom edge of the round hole 6 is extruded under the effect of step formation 9 on the top of bottom die 7 when appropriate force of pressure is applied to the flange end 1 of metal round rod 3 in the press 11, as illustrated in FIG. 8.

Figure 11:
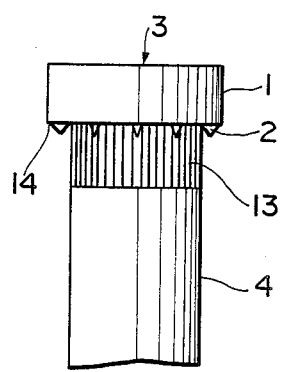
FIG. 11 and 12 are front views of further forms of metal round rod usable in the method of the present invention.

Referring next to FIG. 11, the metal round rod 3 is formed around the periphery of its neck portion immediately below the end flange 1 with a multitude of grooves 13 as by knurling, which extented longitudinally of the stem portion 4 for an appropriate length (e.g., a length corresponding to the thickness of metal plate 5). These grooves 13 are formed in a desired number around the external surface of the neck portion of metal round rod 3 to serve the purpose of receiving the metal 12 of metal plate 5 in its region around the bottom edge of round hole 6 as the metal 12 is extruded radially inwardly against the metal round rod 3 and, on account of this, the metal round rod 3 can be bonded to the metal plate 5 in particularly firm and stable fashion, as illustrated in FIG. 10.

Figure 12:
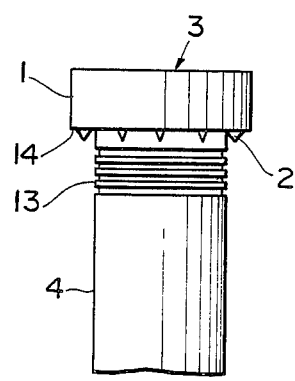

In this connection, it will be readily recognized that, through the grooves 13 illustrated in FIG. 11 are straight extending longitudinally of the stem portion 4, they may also take the form of one or a number of annular grooves extending circumferentially around the stem portion 4 of metal round rod 3, as illustrated in FIG. 12. Also, it is to be noted that the grooves 13 are intended only to aid in crimping the stem portion 4 and their location, size and number can be freely selected as required to serve the intented function.

Further, in the embodiment shown in FIG. 10, the metal 12 of metal plate 5 in its region around the bottom edge of round hole 6 is compressed radially inwardly against the metal round rod 3 and is thus driven into the grooves 13 formed in the stem portion 4 of metal round rod 3 which at the same time the projections 2 on the underside of the flange 1 of metal round rod 3 are formed to bite into the top surface of metal plate 5. As the consequence, not only the strength of bond obtained between the two members 3 and 5 is further raised but the torsional resistance of the assembly to relative rotation is substantially improved. In cases where the material of metal round rod 3 is harder than that of metal plate 5 and if, as shown in FIG. 9, there is no formation of grooves 13 in the neck portion of metal round rod 3, the grip or crimping effect of material 12 of the metal plate 5 upon the metal round rod 3 will not be sufficient to ensure any firm and stable bonding engagement between the metal plate 5 and the flange 1 of metal round rod 3 and hence any substantial improvement in torsional strength of the assembly will not be attainable. On the other hand, it is to be clearly noted that the torsional strength of the assembly can be substantially improved even in cases where the metal rod 3 is made of harder material by providing a groove or grooves 13 in the neck portion of metal rod 3 immediately beneath the end flange 1 in order to allow metal 12 of metal plate 5 to enter more deeply into the neck portion, as shown in FIG. 10.

ADVANTAGEOUS EFFECTS OF THE INVENTION

With the construction described herein above, if will be appreciated that the metal round rod 3 can not only be firmly but the torsional resistance of the assembly to relative rotation under twisting moment can be improved as metal 12 of metal plate 5 in its region around the bottom edge of the round hole 6 formed therein is compressed radially inwardly against the stem portion 4 of metal round rod 3 to crimp or firmly grips the latter while at the same time the projections 2 on the underside of the flange 1 of metal round rod 3 are forced to bite into the top surface of metal plate 5. Further, it is will be recognized that the adhesion or bond strength between the mated metal members 3 and 5 can also be increased with respect to axial forces as act upon the metal round rod 3 in the direction from its free end toward its flanged end 1, that is, in the direction opposite to the direction of insertion of the metal round rod 3 into the metal plate 5 and thus the bond between the two members can be made particularly firm and stable. A further advantage of the present invention is that ordinary carbon steels can be used satisfactorily as material of the metal round 3, without necessitating any specialized heat treatment thereon, and this enables and this low-cost production of method round rods and hence of rod plate assemblies.

I claim:

1. A method of bonding a metal round rod to a metal plate at right angles thereto, in which the metal round rod is formed at one end thereof with an annular radially extending flange and a plurality of circumferentially spaced projections extending from the underside of the flange toward the other end of the metal round rod, the metal plate having a round hole formed therethrough to receive the stem portion of the flanged metal round rod the method comprising the steps of:
   inserting the stem portion of the flanged metal round rod axially through a top edge of the round hole in the metal plate;
   resting the projections on the underside of the flange on a top surface of the metal plate;
   placing the metal plate, with the metal round rod inserted therein, on top of a bottom die;
   inserting the stem portion, of the metal round rod which extends downwardly beyond the metal plate, in an insertion hole formed in the bottom die, a diameter of the insertion hole being slightly larger than that of the stem portion of the metal round rod, the bottom die having an annular step formation of alternate grooves and ridges on a top surface of the bottom die around a top edge of the insertion hole;
   applying a pressing force onto the top surface of the flange of the metal round rod;
   driving the projections on the underside of the flange into the adjacent, top surface of the metal plate until the underside of the flange abuts the top surface of said metal plate, while radially compressing the metal of the metal plate in its region around a bottom edge of the round hole in the metal plate against the metal round rod at the same time as the projections are driven into the metal plate, and crimping the stem portion of the metal round rod with the compressed metal of the plate under the effect of the annular step formation on the bottom die.

2. A method as claimed in claim 1, in which the flanged metal round rod is preliminarily formed on its neck portion immediately beneath the flange with at least one groove extending longitudinally of the neck portion so that the metal of the metal plate in its region around the bottom edge of the round hole formed therein is forced under compression into the groove when subsequently a pressing force is applied onto the top surface of the flange of the metal round rod as inserted through the metal plate.

3. A method as claimed in claim 1 further comprising the step of placing a liner of the same thickness as the flange of the metal round rod on top of the metal plates concentrically around the flange prior to said pressure applying step.

* * * * *